United States Patent [19]

Froelich et al.

[11] Patent Number: 4,639,018
[45] Date of Patent: Jan. 27, 1987

[54] JOINT FOR A WATER-CARRYING PIPE SYSTEM

[75] Inventors: Hans Froelich, Bernstadt; Willi Hepperle, Westerstetten; Johann Katzer, Neu-Ulm; Christian Stephany, Ulm, all of Fed. Rep. of Germany

[73] Assignee: Gardena Kress & Kastner GmbH, Fed. Rep. of Germany

[21] Appl. No.: 753,429

[22] Filed: Jul. 10, 1985

[30] Foreign Application Priority Data

Jul. 19, 1984 [DE] Fed. Rep. of Germany ....... 3426575

[51] Int. Cl.$^4$ ............................................ F16L 27/00
[52] U.S. Cl. .................................... 285/184; 285/397
[58] Field of Search ............... 285/185, 191, 184, 397, 285/907

[56] References Cited

U.S. PATENT DOCUMENTS

| 941,863 | 11/1909 | Erikson | 285/185 |
|---|---|---|---|
| 991,595 | 5/1911 | Austin | 285/185 |
| 1,733,521 | 10/1929 | Wuesthoff | 285/185 X |
| 1,765,693 | 6/1930 | Muend | 285/185 X |
| 2,185,164 | 12/1939 | Weinreb | 285/185 X |
| 2,825,586 | 3/1958 | Robboy | 285/907 X |

FOREIGN PATENT DOCUMENTS 6931425  8/1969  Fed. Rep. of Germany.

Primary Examiner—Thomas F. Callaghan
Attorney, Agent, or Firm—Steele, Gould & Fried

[57] ABSTRACT

A joint for a water-carrying pipe system, e.g. for a garden spray, has a joint shoulder with a disk-like part for each pipe end to be connected. The two disk parts are arranged on either side of the hose passed centrally through the joint. On either side of the joint, the hose is connected to the pipe ends in that it is passed through an opening, whose internal diameter is somewhat smaller than the external diameter of the hose. Thus, the hose engages flat on the openings of the pipe ends, so that this in itself leads to a liquid-tight seal.

23 Claims, 4 Drawing Figures

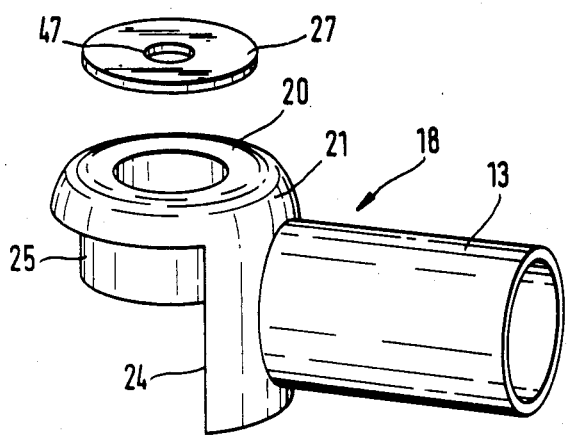
FIG. 4
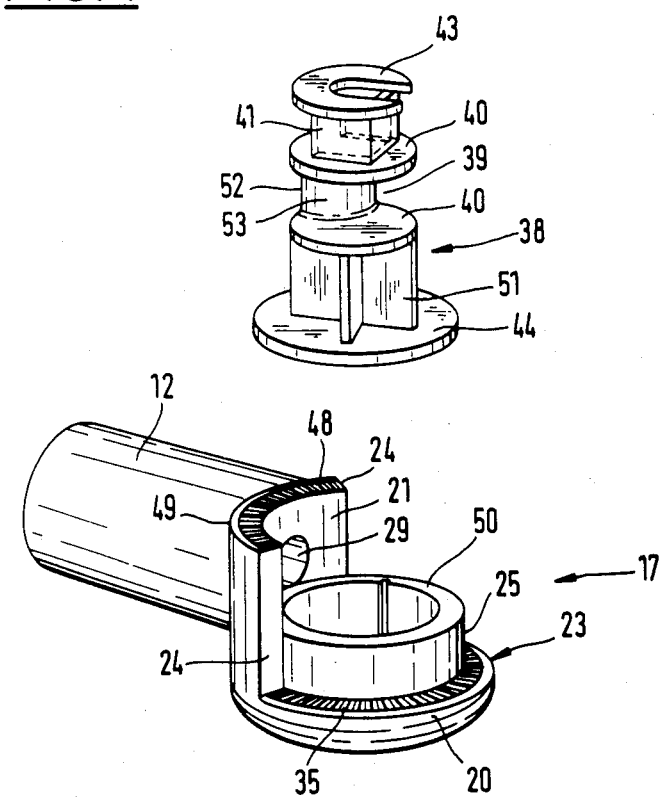

JOINT FOR A WATER-CARRYING PIPE SYSTEM

BACKGROUND OF THE INVENTION

The invention relates to a joint for a watercarrying pipe system, in which each of the pipe ends has a joint shoulder with a disk part provided with a tooth system, located in a plane parallel to the longitudinal axis of the pipes and has a bore for receiving a screw, whose longitudinal axis is at right angles to the longitudinal axis of the pipe and intersects the same and, at least in the joint area, the water is passed through a flexible hose leading through the joint.

Such a joint is known from German Utility Model 6931425, where it relates to a gripping part for a washing brush, which is held on a handle with a joint. The joint connects two pipe parts, the hose passing through the pipes. At the pipe ends remote from the joint, the hose ends are fixed by means of a nipple which can be pressed against an insert by a cap nut. Although there are pipes here, they are not used for carrying water, and instead the hose must pass through the pipes. The disk parts are arranged on one side of the hose, the disk parts having a definite spacing from the pipe ends. Thus, bending moments which occur are only poorly absorbed and the actual joint is exposed to considerable stresses.

SUMMARY OF THE INVENTION

The problem of the invention is to provide a joint for a water-carrying pipe system, which is simple and inexpensive to manufacture, which has a long life and in which the bending moments which occur can be better absorbed. Joints of this type can e.g. be used in car washing brushes as well as in sprayers, e.g. spraying nozzles.

According to the invention, this problem is solved in that the disk parts of the joint shoulders are arranged on opposite sides of the hose or joint, and the hose is only present in the vicinity of the joint, and is connected in liquid-tight manner to the pipe ends on either side of the joint. Through the arrangement of in each case at least one disk part on both sides of the joint, there is an increase in the spacing over which forces act, so that for geometrical reasons alone there is a greater loadability or a longer service life. Nevertheless, the advantage is retained that the hose can be passed through the actual joint point, so that on bending down the joint, the hose is merely bent, without undergoing a length change. Due to the fact that the hose is ony provided in the actual joint area and is connected in liquid-tight manner to the pipe ends of the side of the joint, the actual pipes can be used for carrying the liquid, so that there is only a relatively short hose portion. This obviously reduces the material and storage costs, so that the joint can be manufactured much less expensively.

In principle, it is possible to provide two disk parts on either side of the joint, and in each case have a tooth system, so that the joint can be fixed in random angular positions with the aid of a tightenable screw. However, it is particularly advantageous if, according to a further development of the application, the joint shoulder has a partially cylindrical side part preferably connected in one piece to the disk part and running at right angles to the pipe end. The side part is provided on its front edge directed away from the disk part with a tooth system which cooperates with the tooth system of the disk part of the in each case other joint shoulder. This leads to a particularly favourable firm connection of the joint, because the side parts contribute to strengthening the joint.

According to a further development, the three longitudinal edges of the side part cooperate to limit the pivoting movement of the joint. Whereas in the case of the known joint, a pivoting by almost 180° is possible, which leads to a considerable stressing of the hose, it is possible by using simple means in the invention to achieve a stop or impact limitation. For example, the longitudinal edges can be arranged in such a way that it is possible to pivot in both directions by approximately 60° from a neutral position.

The invention also proposes that the disk part on its side facing the in each case other disk part has a cylindrical shoulder for guiding the lateral part of the in each case other joint shoulder. This also leads to an improved, reinforced construction of the joint and now the guidance is no longer provided by the screw, but by the outsides of the cylindrical shoulders, against which engages the inside of the concentric side parts. Thus, guidance is not only distributed over a large surface area, but is further displaced to the outside, so that favourable angular ratios are obtained.

The invention also proposes that when the joint is assembled, the spacing of the free front edges of the cylindrical shoulders roughly corresponds to the hose diameter. Thus, the cylindrical shoulders have the maximum possible size, so that guidance is distributed over the largest possible surface.

According to a further development, the pipe ends can extend to the immediate vicinity of the joint. Whereas in the prior art the pipe ends have a definite spacing with respect to the joint, it is possible according to the measures of the invention for the hose to be no longer accessible from the outside in the vicinity of the joint, so that there is no longer any risk of damage. The hose is almost completely enclosed by the disk parts, the side parts and the cylindrical shoulders, so that it has maximum protection.

The invention also proposes that the pipe ends are constructed in one piece with the joint shoulders. A plastic construction is particularly suitable for this purpose, so that the pipe ends, including the joint shoulders can be in one piece.

According to a further development of the invention, the outer edge of the tooth system of the disk part and the side part has a spacing from the particular outer edge and the other tooth-free parts are constructed for reciprocal engagement with one another. Thus, the bending moment when using the pipe system provided with the joint is not transferred to the tooth system, but to the outer tooth-free parts, which are positioned further outside and can consequently better absorb the resulting forces. The tooth system itself does not have to absorb these forces, so that there is no risk of damage or overstressing of the tooth system teeth. It can also be provided that the tooth system of the outer part, namely the disk part, radially engages over the tooth system of the inner part, namely the side part. This leads to a much greater strength being achieved at right angles to the pivoting direction of the joint, because as a result of the engaging-over edge the base surface, which has to absorb the bending forces is virtually doubled.

Whereas in the prior art the hose with its ends was pressed on to a nipple, which is constructed for the connection of a water hose or the like, for fixing the hose the present invention proposes that it is rigidly held in the pipe end in a guide surrounding it from the outside and which extends directly into the joint area. In the joint area in the case of the prior art, the hose is inserted in a radial spacing into the pipe ends, so that the latter cannot guide the hose. However, according to the invention the hose is rigidly inserted and held in a guide, which can in particular be a bore. The bore diameter can be somewhat smaller than the hose diameter. By inserting the hose under prestressing into the guide, a tight engagement of the hose wall is achieved, so that adhesion or additional sealing is unnecessary. Under load, i.e. under hydraulic pressure, the flexible hose engages with a greater force against the guide, so that there is a constant improvement to the sealing action. It is merely necessary to draw in the hose from one side through the cylindrical bores. It has been found that this simple procedure leads to a very satisfactory and favourable sealing action. The pipe end can have a tubular shoulder directed away from the joint in an extension of the bore, which increases the bearing surface to an even greater extent, without making manufacture more difficult or expensive. Devices can be provided which provide for a partial diameter reduction to obtain a greater pressing action. The hose preferably extends at least up to the free end of the tubular shoulder, whilst preferably projecting over the same, to a limited extent.

According to the invention, for the purpose of reinforcing the joint, it is provided with a roughly cylindrical, preferably metal insert arranged concentrically to the joint axis with a cross-hole for receiving the hose. This insert can be used for reinforcing the joint, because it substantially forms a shaft, about which the one joint shoulder can be pivoted. In addition, the insert can be used for guiding the screw, e.g. it can have a taphole. The insert is preferably inserted in the cylindrical projection of a joint shoulder and is connected in nonrotary manner therewith and for this purpose can be provided with at least one longitudinal rib, which is guided in a corresponding longitudinal slot of the cylindrical projection. The cross-hole for the passage of the hose is preferably given a funnel-shape, the side walls of the funnel being in particular convexly curved, so that on bending down the joint, they offer a curved side wall for the hose against which it can engage. Although there is not normally a bending down of the hose, said curved side wall can help to prevent this.

The insert can have a cage for receiving a nut whose cross-section can correspond to that of the nut. At least in the vicinity of a cylindrical projection, the insert can have circumferentially directed ribs, which contribute to reducing the friction in this area. In the same way, the inner wall of at least one cylindrical projection can have longitudinal ribs, which also contribute to reducing friction.

According to the invention, at least one plastic pipe end is pressed together with a metal pipe. With the exception of the insert, the joint is made entirely from plastic, whilst the pipes are made from metal.

BRIEF DESCRIPTION OF THE DRAWINGS

The invention is described in greater detail hereinafter relative to non-limitative embodiments and the attached drawings, wherein show:

FIG. 4 in greatly simplified form, and in perspective, an exploded representation of the joint.

DETAILED DESCRIPTION OF THE PREFERRED EMBODIMENTS

Figure 1:
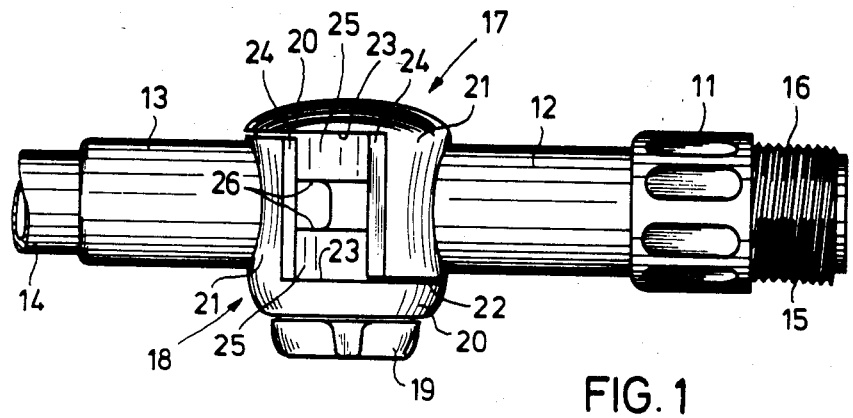
FIG. 1 a diagrammatic side view of a joint proposed by the invention.

The joint diagrammatically shown in FIG. 1 is used for the articulated connection of a pipe end 12 provided with a coupling 11 to a second pipe end 13, which is fixed to a pipe 14 shown in broken away form. Such a coupling can e.g. be used in the supply pipeline to a washing brush or garden spray. At its free end, coupling 11 has a screw attachment 15 with an external thread 16, with the aid of which a coupling nipple can be screwed down. Each of the two pipe ends 12, 13 has a joint shoulder 17, 18, both of which can have a similar construction and can be locked in any random angular position with the aid of a knob 19. Each joint shoulder contains a disk part 20, running roughly parallel to the longitudinal axis of the particular associated pipe end 12, 13. A side part 21 shaped like a circular cylinder is connected in one piece with disk part 20 and its longitudinal axis is at right angles to the longitudinal axis of pipe ends 12, 13 and intersects the same. The front edge 22 of each side part 21 directly faces the inside 23 of each disk part 20. The two longitudinal edges 24 of each side part 21 whereof only one is seen in FIG. 1, are spaced from one another. On the insides 23 of both disk parts 20 is in each case provided a cylindrical projection 25, which is positioned within the side parts 21. The free front edges 26 of the cylindrical projections 25 are spaced from one another.

Figure 2:
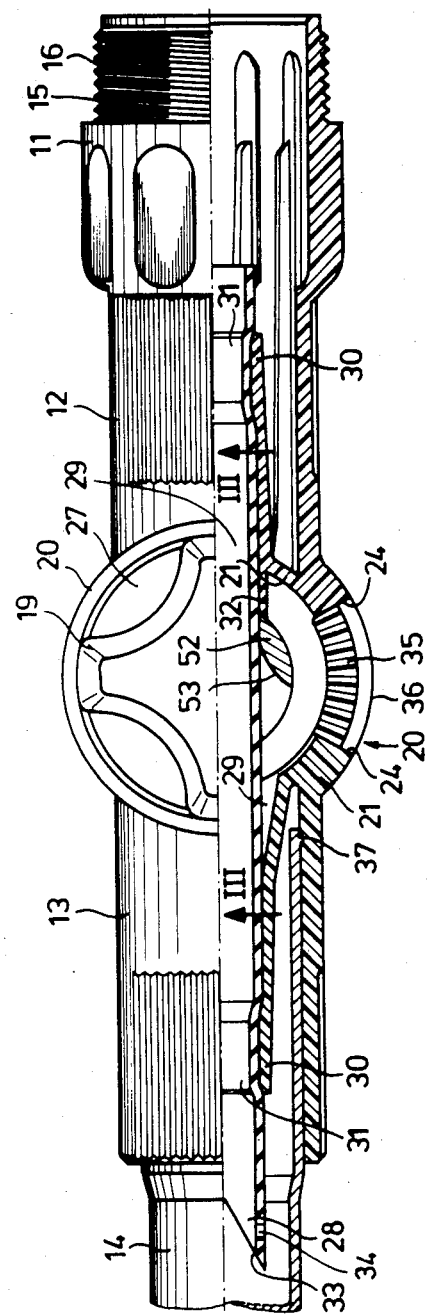
FIG. 2 a half-sectional plan view of the joint from the direction of the clamping screw.

FIG. 2 shows a plan view of the coupling from the direction of knob 19, which is roughly shaped like a four-armed star. Below it is provided a metal plate 27, which is provided in its centre with a hole. The metal plate 27 is placed on the top of the disk part 20.

The arrangement of hose 28 can be gathered from the lower half of FIG. 2, which is a section through the arrangement. Both side parts have a bore 29 directed in the longitudinal direction of the associated pipe end 12, 13, through which is passed the hose 28. On the side of each side part 21 remote from the joint is provided a tubular shoulder 30, which represents an extension of bore 29. The tubular shoulder has an internal diameter, which is somewhat smaller than the external diameter of hose 28, so that the latter engages with pretension on the inside of the pipe shoulder 30. In the vicinity of the end of the pipe shoulders 30 a reduced diameter portion 31 is provided, so that there is a better engagement of the hose in this area. On the right-hand side wall 21 of pipe end 12 in FIG. 2, a short shoulder 32 is provided in the direction of the joint and which once again constitutes a guide for the hose 28 within the joint.

At its left-hand end 33 in FIG. 2, hose 28 is cut off in sloping manner and is provided there with a hole 34. Insertion of hose 28 takes place from the right in FIG. 2, a wire with a hook being passed through the shoulders 30 and the hook can be engaged with hole 34. The hose is then drawn with the aid of the hook through shoulders 30 and holes 29. Hose 28 projects somewhat on either side of the tubular shoulders 30.

The inside 23 of disk part 20 is visible in FIG. 2 has a tooth system 35, whose outer edge is clearly spaced from the outer edge 36 of disk part 20. It is also possible to see therein the spacing between the longitudinal edges 24 of side parts 21.

In the case of the left-hand pipe end 13 in FIG. 2, a metal pipe 14 is pressed thereinto and is provided at its front end with a barb-like contouring 37.

Hose 28 leads precisely to the centre of the joint, so that on bending down the latter the hose is merely bent, but does not undergo a length change.

Figure 3:
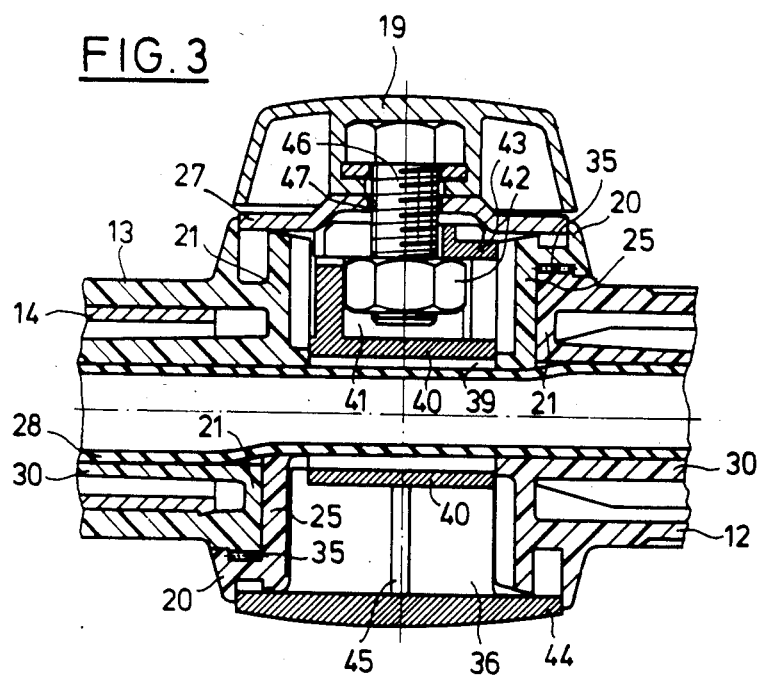
FIG. 3 a section roughly along line III—III of FIG. 2 on a larger scale.

FIG. 3 shows details of the joint. The left-hand pipe end 13 therein is constructed in one piece with the upper disk part 20, as well as the left-hand side wall 21. Correspondingly, the right-hand pipe end 12 in FIG. 3 is constructed in one piece with the lower disk part 20, and the right-hand side wall 21. The cylindrical projection 25 in FIG. 3 belongs in one piece to the right-hand pipe end 12, whilst the upper cylindrical projection 25 in FIG. 3 belongs in one piece to the left-hand pipe end 30. The lower cylindrical projection 25 forms a bearing surface for the left-hand side wall 21, whilst the upper cylindrical projection 25 forms a bearing surface for the right-hand side wall 21. Thus, the two pipe ends 12, 13 can be pivoted up to one another.

The edge area of the bottom surface of the upper disk part 20 has a tooth system 35, which cooperates with a tooth system on the top edge of the right-hand side part 21. This also applies to the top surface of the lower disk part 20. As can be gathered from FIG. 3, disk part 20 rests on side parts 21 radially outside tooth system 35. Thus, forces which could e.g. lead to pivoting in the clockwise direction, are absorbed by the smooth bearing surfaces and not by tooth system 35.

The joint is centrally traversed by a metal insert 38. Cylindrical insert 38 has a cross-hole 39, through which hose 28 is passed. Cross-hole 39 is enclosed at the top and bottom by a disk 40. Above disk 40 is provided a cage 41 for a hexagonal nut 42, which is terminated at the top by a plate 43. Insert 38 is provided on its bottom with a widened stop plate 44, which rests on one edge of the lower disk part 30. Insert 38 is connected in non-rotary manner with said lower disk part 20, for which purpose a rib 45 is provided running in the longitudinal direction of insert 38 and engaging in a slot of cylindrical projection 25. In non-rotary manner, knob 19 has a screwed shank 46, which passes through a central bore 47 in metal plate 27 and an opening in plate 43 and is screwed into nut 42. Tightening of knob 19 leads to the stop plate 44 and metal plate 27 being pressed on to one another, so that disk parts 20 are pressed on to the edges of side parts 21. This leads to an engagement of the tooth system 35 and consequently to a locking of the joint in a random angular position.

To provide a better understanding, FIG. 4 shows a simplified form of the details of the joint The metal insert 38 is shown in the centre, although it must be inserted from the bottom on assembling the joint. The lower pipe end 13 in FIG. 4 is provided with a side part 21, which is provided with a tooth system 48 on its upper front edge. As has already been stated, system 48 is spaced from the outer edge 49 of side wall 41. The latter extends over an angle of approximately 120°, so that its longitudinal edges 24 have a certain spacing from the corresponding longitudinal edges 24 of the second side part 21, consequently limit the pivotability of the joint. Side part 21 has a bore 29, which is approximately located in the longitudinal axis of pipe end 13. A cylindrical projection 25 is connected in one piece with side part 21 and the lower disk part 20, and its upper front edge 50 is flush with the lower edge bore 29. The inside 23 of disk part 20 also has a tooth system 35, whilst the outer edge is free from such a tooth system.

Insert 38 is inserted from the bottom into the joint shoulder 18 shown at the bottom of FIG. 4. The internal diameter of the cylindrical projection 50 is smaller than the external diameter of stop plate 44. Above stop plate 44, the insert is provided with four blades 51, which can e.g. engage in slots on the inside of cylindrical projection 25 and consequently lead to a non-rotary connection between insert 38 and joint shoulder 18. One of the two disks 40 is positioned above blades 51 and is connected by means of side parts 52 to the second disk 40 and said side parts form between them the cross-hole 39 for hose 28. FIG. 2 shows that the inner side wall 53 of side part 52 is convexly curved and consequently forms a bending preventer for hose 28. Above the upper disk 40 is positioned cage 41 for nut 42, which is open from the right. Insert 38 is terminated at the top by plate 42, which has a slit for the passage of the threaded shank 46.

The second upper joint shoulder 17 in FIG. 4 is almost identical to joint shoulder 18. Once again disk part 20 and cylindrical projection 25 are connected in one piece with the side wall 21, the complete joint shoulder passing in one piece into pipe end 12. Joint shoulder 17 is mounted from above on joint shoulder 18 and insert 38, so that the outside of cylindrical projection 25 is guided on the inside of side part 21, whilst the inside of projection 25 is guided on the outside of insert 38. On the circumference of disk 40 and plate 43 ribs are formed which reduce friction on pivoting the joint.

Metal plate 27 is placed on the top of the upper joint shoulder 17 and knob 19 with its threaded shank 46 is passed through bore 47. The represented joint comprises two in each case one-piece joint shoulders 17, 18, metal insert 38, knob 19, nut 42 and hose 28, i.e. very few components in all, but it still functions in a very satisfactory manner.

What is claimed is:

1. A joint for a liquid-carrying pipe system, in which connected ends of two rigid pipes in each case have a joint shoulder with a disk part provided with a tooth system, arranged in a plane parallel to a longitudinal axis of the pipes and having a bore for receiving a fastening element, the fastening element having a longitudinal axis at right angles to the longitudinal axis of the pipes and, said system having a flexible hose for guiding liquid in the system through the joint, wherein the disk parts are arranged on opposite lateral sides and on either longitudinal side of the joint, the hose being connected in liquid-tight manner to the pipe ends.

2. A joint according to claim 1, wherein the joint shoulder for each of the two pipes has a partially cylindrical side part running at right angles to the pipe end and is connected in one piece to the disk part, said side part being provided on a front edge thereof directed away from the disk part with a tooth system, which cooperates with the tooth system of the disk part of the joint shoulders of the other of the two pipes.

3. A joint according to claim 2, wherein free longitudinal edges of the side parts cooperate to limit pivoting movement of the joint.

4. A joint according to claim 2, wherein the disk part for each of the two pipes is provided on its side facing the disk part of the other of the two pipes with a cylindrical projection for guiding a side part of the joint shoulder of said other of the two pipes.

5. A joint according to claim 4, wherein, with the joint assembled, free front edges of the cylindrical projections are spaced roughly corresponding to a diameter of the hose.

6. A joint according to claim 1, wherein the pipe ends extend directly up to the joint.

7. A joint according to claim 1, wherein the pipe ends are constructed in one piece with the joint shoulders.

8. A joint according to claim 2, wherein an outer edge of the tooth system of the disk part and the side part is in each case spaced from its particular outer edge, and the outer parts are of the disk part and the side part are toothless and are constructed for reciprocal engagement.

9. A joint according to claim 1, wherein the hose is rigidly secured in the pipe end in a guide surrounding it from outside and which extends directly into the joint area.

10. A joint according to claim 9, wherein the guide is at least partly constructed as an approximately cylindrical bore.

11. A joint according to claim 10, wherein the pipe end has a tubular shoulder directed away from the joint in an extension of the bore.

12. A joint according to claim 11, wherein the hose at least extends up to a free end of the tubular shoulder.

13. A joint according to claim 1, wherein the joint has an approximately cylindrical insert arranged concentrically to an axis of the joint and has a cross-hole for receiving the hose.

14. A joint according to claim 13, wherein the insert is placed in the cylindrical projection of a joint shoulder and is non-rotatably fixed with respect to the cylindrical projection.

15. A joint according to claim 13, wherein the crosshole widens in funnel-like manner with convex side walls.

16. A joint according to claim 13, wherein the insert has a cage for receiving a nut.

17. A joint according to claim 13, wherein the insert has circumferential ribs at least in the vicinity of a cylindrical projection.

18. A joint according to claim 14, wherein an inner wall of the cylindrical projection has longitudinal slots.

19. A joint according to claim 1, wherein at least one of the pipe ends is plastic and is pressed together with a metal pipe.

20. A joint according to claim 1, wherein at least one of the pipe ends is plastic and is connected to a coupling.

21. A joint according to claim 13, wherein the cylindrical insert is metal.

22. A joint for a liquid-carrying pipe system comprising two rigid pipes, each pipe having a joint shoulder of a similar construction so as to be capable of connection at random angular positions, each shoulder having a bore and a disk member provided with a tooth system and arranged in a plane parallel to a longitudinal axis of said pipes, said shoulder including a side part with a circular cylinder shape integral with the disk member, a substantially cylindrical insert centrally traversing said joint having a cross-hole for receiving a flexible hose, a flexible hose passing through said cross-hole and said joint for guiding liquid in said system through said joint, and means for fastening together said pipes.

23. The joint according to claim 22 wherein said insert is non-rotatably fixed within said joint.

* * * * *